United States Patent [19]

Kuhn

[11] Patent Number: 5,281,335
[45] Date of Patent: Jan. 25, 1994

[54] PROCESS, INSTALLATION AND REACTOR FOR BIOLOGICAL TREATMENT OF WASTE WATER

[76] Inventor: Eberhard Kuhn, Weiherer Str. 38, D-7526 Ubstadt-Weiher, Fed. Rep. of Germany

[21] Appl. No.: 820,646
[22] PCT Filed: Jul. 24, 1990
[86] PCT No.: PCT/DE90/00557
  § 371 Date: Jan. 16, 1992
  § 102(e) Date: Jan. 16, 1992
[87] PCT Pub. No.: WO91/01948
  PCT Pub. Date: Feb. 21, 1991

[30] Foreign Application Priority Data

Jul. 28, 1989 [DE] Fed. Rep. of Germany ....... 3925091

[51] Int. Cl.$^5$ ............................. C02F 3/08; C02F 3/30
[52] U.S. Cl. ................................... 210/605; 210/619; 210/151; 210/195.1; 210/260; 210/903
[58] Field of Search ............... 210/619, 605, 607, 621, 210/630, 903, 130, 151, 195.1, 219, 259, 260, 202, 903

[56] References Cited

U.S. PATENT DOCUMENTS

| | | | |
|---|---|---|---|
| 3,704,783 | 12/1972 | Antonie | 210/151 |
| 3,869,380 | 3/1975 | Torpey | 210/619 |
| 3,945,916 | 3/1976 | Boulenger | 210/619 |
| 4,163,720 | 8/1979 | Mueller | 210/197 |
| 4,421,648 | 12/1983 | Besik | 210/151 |
| 5,073,256 | 12/1991 | Sieksmeyer et al. | 210/151 |

FOREIGN PATENT DOCUMENTS

| | | |
|---|---|---|
| 2808790 | 9/1978 | Fed. Rep. of Germany . |
| 3016920 | 11/1981 | Fed. Rep. of Germany . |
| 3427310 | 2/1985 | Fed. Rep. of Germany . |
| 2715256 | 12/1987 | Fed. Rep. of Germany . |
| 3833185 | 4/1990 | Fed. Rep. of Germany . |
| 596995 | 1/1984 | Japan . |
| 62-57697 | 3/1987 | Japan . |
| 8900287 | 3/1989 | PCT Int'l Appl. . |

*Primary Examiner*—Christopher Upton
*Attorney, Agent, or Firm*—James Creighton Wray

[57] ABSTRACT

A process for biological treatment of waste water is characterized by the following sequence of steps: mixing of the incoming raw waste water with activated sludge containing a first, chemoorganotrophic biocenosis in an anerobic preliminary stage (APS); separation of the solution from the activated sludge in an intermediate settling basin (IS); nitrification of the separated solution by means of a second, chemolithotrophic biocenosis in a nitrification stage (NIR) with an aerobic medium; remixing of the nitrified solution with the activated sludge containing the first, chemoorganotrophic biocenoses; common denitrification of the mixture of solution and activated sludge in a denitrication stage (DER) with an anoxic medium; aeration to obtain an aerobic medium; separation of the purified waste water from the activated sludge in a resettling basin (RSB); recycling (C) of the activated sludge to the anaerobic preliminary stage (APS).

15 Claims, 2 Drawing Sheets

PROCESS, INSTALLATION AND REACTOR FOR BIOLOGICAL TREATMENT OF WASTE WATER

BACKGROUND OF THE INVENTION

The invention relates to the cleaning of waste water using a continuous biotechnological process.

Treatment of the waste water to be cleaned comprises the process-technological basic operations of substance transformation and separation. Hereby four task areas may be derived from each other: removal of organic substances (carbon decomposition), oxidative transformation of the inorganic nitrogen compounds ammonium and nitrite into nitrate (nitrification), transformation of the nitrate and nitrite, into gaseous nitrogen compounds (denitrification), and biological elimination of phosphorus without using external chemical precipitants.

In order to realize these tasks, special microorganisms which have the respectively needed special capabilities for substance transformation are used. These specialized microorganisms shall be present in a waste water treatment plant in the largest possible number in order to enable high substance transformation rates and thus efficient cleaning of the waste water.

SUMMARY OF THE INVENTION

Since waste water treatment plants are usually operated as open installations, the settlement of the necessary organism types cannot be preadjusted by addition of a starter culture. Rather, a large number of microorganisms are continuously supplied with the incoming waste water and from the surrounding atmosphere. Thus, a variety of microorganism types which occur simultaneously and combine in a biocenosis are always present.

In order to control the settlement of special types of organisms, to offer a propagation advantage to the desired types within the biocenosis, i.e. to increase their population strength, and thus to finally create the conditions for efficient waste water cleaning, selectively acting operating parameters must be set and maintained in several consecutive process steps.

Processes for biological waste water treatment are known in which the activated sludge that contains the required microorganisms in biocenosis is kept in a biologically closed system. During the so-called main stream process the activation basin is preceded by an anaerobic mixing basin for raw waste water and recycled activated sludge which has been separated from the cleaned waste water. In this anaerobic preliminary stage, phosphate is redissolved and is then accepted in the aerated activation basin by the bacteria to an increased extent and is removed from the system together with the excess sludge. Standard processes include in addition to biological phosphorus elimination, a stage during which nitrogen is decomposed.

The following summation parameters which relate respectively to a partial amount of contamination in the waste water are characteristic values for such biotechnological processes for waste water treatment:

DOC (dissolved organic carbon): the organically bonded carbon contained in the solution.

BSB5: the oxygen consumed by the bacteria in a waste water sample within 5 days.

TKN (Total Kjeldahl Nitrogen): the sum of organically bonded nitrogen which is fixated in ammonium.

The task of this invention is the description of a further developed process for biological waste water treatment which is characterized by higher denitrification performance, a smaller concentration of nitrogen and phosphate in the issue, and a lower critical BSB5/TKN ratio. The installations necessary for implementing the improved process shall also be made available.

According to the invention the task is solved by the process for biological waste water treatment in Claim 1. Hereby each of process steps a) and b) as well as e) to h) is already known per se. But the suggested process differs principally from main stream processes known in the past by the separation of the solution from the activated sludge following the anaerobic preliminary stage, the separate nitrification of the separated solution with a second chemolithotrophic biocenosis, as well as the subsequent remixing of the nitrified solution with the activated sludge whose chemoorganotrophic biocenosis is not subject to nitrification. In relation to nitrification, the denitrification stage follows later. Aeration of the denitrified biocenosis takes place either only after denitrification in a separate consecutive process step, or already in the denitrification stage itself, e.g. using a NOx-controlled interval aeration, and additionally in a subsequent further process step.

The process according to the invention is based on the following functional principle:

The incoming raw waste water is first brought into contact with a chemoorganotrophic first biocenosis under anaerobic conditions. Hydrolyzing and fermentative bacteria produce low fatty acids from polymeric and monomeric carbon compounds. Phosphate-redissolving bacteria store these fatty acids inside them while giving off phosphate. This results in a selective segregation of the waste water whereby the organically bonded carbon (DOC) is essentially reduced, while nitrogen content is reduced and phosphate content rises sharply.

During the second process step the solution is separated from the activated sludge and thus also from the first biocenosis.

The separated solution is nitrified separately using a second chemolithotrophic biocenosis. The issue of the nitrification stage is then again brought into contact with the first chemoorganotrophic biocenosis.

This is followed by oxidation of the carbon compounds stored in the P-redissolving bacteria whereby nitrate acts as electron acceptor. Part of the energy released in the process is used for accepting phosphates. Nitrogen and carbon are assimilated parallel with this.

During the following process step, the denitrified mixture of solution and activated sludge is aerated so that an aerobic environment is created. In the process further phosphate is removed from the solution.

The process concludes with the separation of the cleaned waste water from the activated sludge which is again recycled into the anaerobic preliminary stage.

The invented separate nitrification of the solution in connection with subsequent denitrification results in a distinct increase in denitrification performance compared to main stream processes with simultaneous or previous denitrification known so far. This has the result that the discharged cleaned waste water contains significantly smaller amounts of nitrogen and the critical BSB5/TKN ratio is much lower. Use of the process according to the invention is also able to minimize costs of the aeration necessary for carbon oxidation.

The suggested process may be used in as far as an essential elimination of carbon in the anaerobic preliminary stage is ensured. The condition for this is that the BSB5 value for the incoming raw waste water is not too high, since the capacity of the P-redissolving microorganisms for storing carbon is limited. However, the soil concentrations commonly found in communal waste water should fall within this permissible range. In addition, the time distribution of the supplied loads should not have too strong peaks, since otherwise easily decomposable carbon compounds will survive into the nitrification stage. Since according to the invention the nitrification stage is arranged prior to the denitrification stage and aeration stage, the incoming raw waste water must have a sufficient buffer capacity.

In an alternative version of the process according to the invention, the separate nitrification of the solution is followed by combined simultaneous denitrification of the solution and the activated sludge in an alternating aerobic and anoxic environment instead of by combined pure denitrification. Hereby a residual nitrification/-denitrification takes place.

The task relating to the description of a corresponding installation for implementing the suggested process is solved by the four-stage plant for biological waste water treatment in Claim 3. The use of an anaerobic preliminary basin, intermediate settling basin, nitrification reactors, denitrification reactors, resettling basin, aerators, as well as a sludge recycling system are individually known per se. Compared to the state of technology, however, the arrangement of these components according to the invention is new, in a waste water treatment plant whereby an important characteristic is the provision of a sludge bypass through which the activated sludge is passed without prior aeration from the intermediate settling basin directly, i.e. by bypassing the nitrification reactor, into the denitrification reactor.

In the four-stage treatment plant suggested here as a first alternative of a process-technological realization, the critical BSB5/TKN ratio is relatively low since the cascade-like arrangement of the individual components results in a small runback ratio and high denitrification rates may be achieved.

The installation according to the invention is characterized by a splitting of the volume streams in the intermediate settling basin. The ratio between volume streams supplied to the nitrification stage and that of the activated sludge passed through the sludge bypass should be as large as possible since then a high percentage of the nitrogen is available in the form of nitrate for the subsequent denitrification in the following denitrification stage. The ratio achievable during practical operation is determined by the settling behavior of the activated sludge in the intermediate settling basin.

The provision of an aerator for aerating the mixture of solution and activated sludge following the denitrification is another important characteristic of the invention.

A possible aerator is e.g. a terminal aeration basin which may also be integrated together with the denitrification reactor in a combined component. But the aeration necessary for temporary creation of an aerobic environment may also be implemented with a NOx-controlled oxygen interval aerator.

In an alternative version of the installation according to the invention, the denitrification reactor may be replaced with a simultaneous denitrification reactor in which simultaneous denitrification/residual nitrification of the mixture of solution and activated sludge takes place in alternately aerobic and anoxic environment.

A solid bed reactor, e.g. a dripper, was successfully used as a nitrification reactor; the latter may however also be constructed as an activation stage with its own intermediate settling basin and sludge recycler. It is useful that the denitrification reactor is constructed as an agitator kettle reactor.

In an advantageous version of the invention a sump pump is located between intermediate settling basin and nitrification reactor for decoupling of the streams.

The invention created a specially constructed reactor especially for the technical realization of the suggested process in small plants. This reactor which is described in Claim 10 permits the settlement of the first chemoorganotrophic biocenosis on a submerged biodisk so that it may be called a three-phase submersion reactor.

The three-phase submersion reactor according to the invention is characterized by the division of the reactor vessel into a first compartment in which the supply pipe for the raw waste water ends, and a second compartment which is separated in respect to the stream from the former compartment as well as possible and into which a return pipe for the reintroduction of the separately nitrified solution merges. An important characteristic is also the arrangement of an aerator in the second compartment for creating an aerobic environment which may be limited in terms of location and time.

The incoming raw waste water is passed into the lower part of the first anaerobic compartment and flows upwards between the plates of the submerged biodisk. The growth on the biodisk, representing the first chemoorganotrophic biocenosis, produces low fatty acids from the dissolved carbon compounds and stores them while giving off phosphate. This first compartment thus corresponds to the anaerobic preliminary basin in a standard plant with agitator kettle reactors.

Primary sludge and excess sludge sink to the bottom in the first compartment, settle at the reactor bottom, and reach the second compartment with anoxic environment from below the slowly rotating biodisk.

The excess solution in contrast leaves the first anaerobic compartment via the top discharge and is fed to a separate nitrification. The issue of this nitrification stage which is located outside the three-phase submersion reactor is then returned from below into the second anoxic compartment. Denitrification and phosphate acceptance with the carbon compound stored in the anaerobic part as well as the reduction equivalent contained in the primary sludge takes place here. The waste water solution which has been denitrified in this way flows inside the second compartment to the top and reaches its upper part where the aerator is located. The oxygen supplied there is used by the biocenosis settled on the plates of the biodisk for the oxidation of stored carbon compounds, coupled with an acceptance of phosphate.

The cleaned waste water leaves the reactor through the discharge located at the top part of the second compartment and may possibly undergo resettling.

The three-phase submersion reactor suggested with the invention is characterized by the following advantageous properties: it enables the settlement of a P-redissolving biocenosis on solid surfaces, i.e. on the plates of the biodisk. Energy input is relatively low compared to other systems. Primary sludge is used for optimizing the P-elimination and denitrification. Complex sludge cycles are unnecessary.

In a preferred version of the reactor according to the invention, the separation mechanism is constructed as dividing rods which extend primarily vertically and are located between the plates of the biodisk. It is useful that these dividing rods are anchored with their respective upper ends in an upper dividing wall and with their bottom end in a lower dividing wall. The film consisting of biomass which forms during operation on the dividing rods and the plates of the biodisk is not only used for the biochemical reaction in the reactor, but simultaneously also provides the seal of the former's two compartments. High quality compartmentalization is necessary since the critical BSB5/TKN ratio depends on it.

In a further development of the reactor according to the invention, a sludge channel through which primary sludge and excess sludge pass controlled from the first anaerobic compartment into the second anoxic compartment is located between the lower dividing wall in which the dividing rods are anchored, and the bottom of the reactor vessel. However, the arrangement of a sludge barrier at the inside wall of the reactor vessel below the feed pipes for the raw waste water was found to be successful in maintaining compartmentalization to the greatest possible degree. This sludge barrier should extend close to the circumference of the biodisk.

The provision of mixing blades below the biodisk ensures sufficient mixing of the solution and activated sludge in the lower and intermediate reactor part.

Especially preferred is a version of the reactor in which the aerator is a rotating, semiimmersed additional biodisk whose plates are partially arranged between the plates of the submerged biodisk. The rotation of the additional biodisk introduces oxygen into the upper part of the second compartment, said oxygen being used by the biocenosis settled on the plates of the biodisk for the oxidation of stored carbon compounds, coupled with the acceptance of phosphate. It is useful that the submerged biodisk and the semi-submerged additional biodisk have the same rotating direction, whereby the additional biodisk naturally turns several times as fast as the very slowly turning submerged biodisk.

A (third) refining biocenosis which nitrites ammonium still present in the solution may be settled advantageously on the well aerated plates of the semi-submerged additional biodisk.

Excess sludge formed during waste water treatment may be removed from the reactor if an additional discharge pipe for excess sludge has been provided at the reactor vessel bottom.

The plant is also used to implement the process for biological waste water treatment. This plant has at its core the previously described three-phase submersion reactor and represents an alternative to the technical realization with standard individual components described in Claim 3.

Within the specially constructed three-phase submersion reactor, the incoming raw waste water is pretreated by bringing it into contact with the first chemoorganotrophic biocenosis in the first compartment which represents the anaerobic preliminary stage, as well as subsequent separation of the solution from the activated sludge. The nitrification reactor located between the discharge pipe of the first compartment and the return pipe to the second compartment contains the second chemolithotrophic biocenosis which is used for the nitrification of the separated solution. The subsequent combined denitrification of the solution which was again mixed with the activated sludge takes place in the second compartment of the three-phase submersion reactor. After aeration in the upper part of the second compartment, the solution of the waste water which has been cleaned to this extent is again separated from the activated sludge which remains in the reactor vessel and may possibly be fed to a subsequent resettling basin. The invention is described in more detail using the enclosed drawings.

DETAILED DESCRIPTION OF THE DRAWINGS

Figure 1:
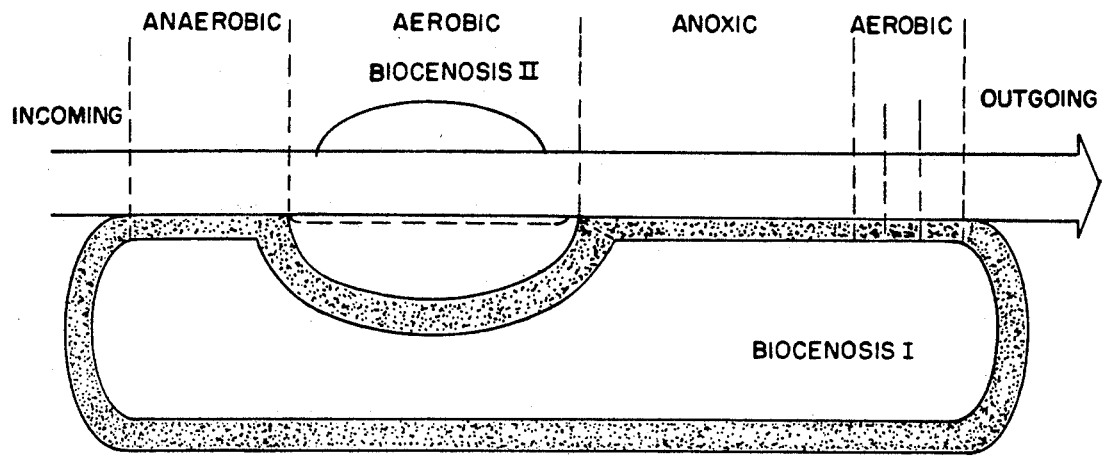
FIG. 1: a process for biological waste water treatment, (elementary diagram)

FIG. 1 shows the process for biological waste water treatment according to the invention, using an elementary diagram. This is a main stream process.

The incoming raw waste water is mixed in an anaerobic preliminary stage with activated sludge which contains a first chemoorganotrophic biocenosis I. The solution is then separated from the activated sludge. In a subsequent nitrification stage with aerobic environment the separated solution is brought into contact with a second chemolithotrophic biocenosis II. The activated sludge bypasses this nitrification stage. During the next process step, the separately nitrified solution is again mixed with the activated sludge which contains the biocenosis I. The mixture of solution and activated sludge is now denitrified together in an anoxic environment. This is followed by a simultaneous denitrification stage during which interval aeration creates alternately an aerobic and anoxic environment. In this way a residual nitrification or denitrification takes place simultaneously. The cleaned waste water is separated from the activated sludge and leaves the system as issue. The activated sludge, and thus biocenosis I, is returned to the anaerobic preliminary stage.

Figure 2:
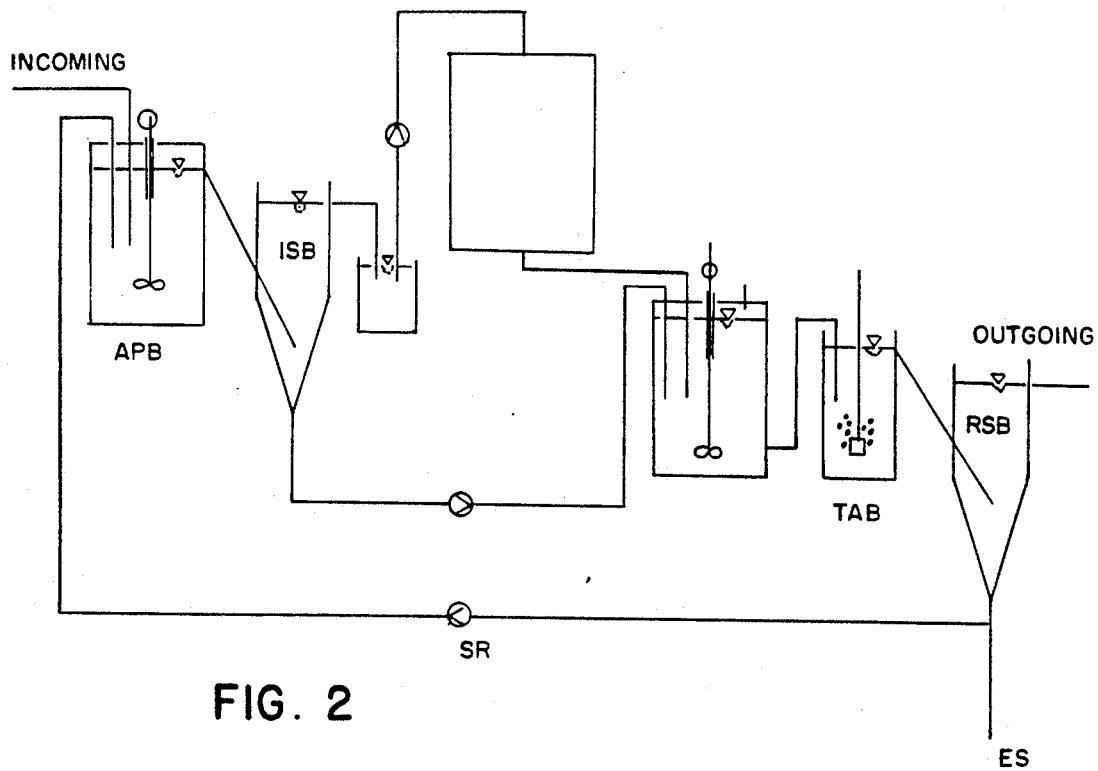
FIG. 2: a first installation for biological waste water treatment (schematic)

The plant shown schematically in FIG. 2 represents a first alternative of a technical realization of the process described with FIG. 1, using standard reactors.

The incoming raw waste water is first given into a fully mixed anaerobic preliminary basin APB which is constructed as an agitator kettle reactor and is there mixed with the first chemoorganotrophic biocenosis I. The activated sludge settles in the following intermediate settlement basin ISB. The excess solution flows into a sump pump SP and is there passed into a nitrification reactor NIR. The nitrification reactor NIR here is a solid bed reactor, e.g. a dripper, in which the second chemolithotrophic biocenosis II has settled. This is followed by a denitrification reactor DER into which the separately nitrified solution is fed.

The activated sludge which has settled at the bottom of the intermediate settling basin ID is pumped via a sludge bypass Byp directly, i.e. by bypassing the nitrification reactor NIR, into the denitrification reactor DER. After combined denitrification of the solution and the activated sludge which was returned comes an aeration of biocenosis II in a subsequent terminal aeration basin (TAB). Alternatively, the aerator may also be integrated in the form of a NOx-controlled oxygen interval aerator (not shown) into the denitrification reactor DER which then becomes a simultaneous denitrification reactor with alternating aerobic and anoxic environment.

The last stage is a resettling basin RSB where the solution is again separated from the activated sludge. The cleaned waste water leaves the plant via the discharge pipe, while the settled activated sludge is pumped back via a sludge return SR into the anaerobic preliminary basin APB and thus remains for the most part in the plant. Excess sludge ES is removed from the plant via a discharge pipe at the resettling basin RSB.

Figure 3:
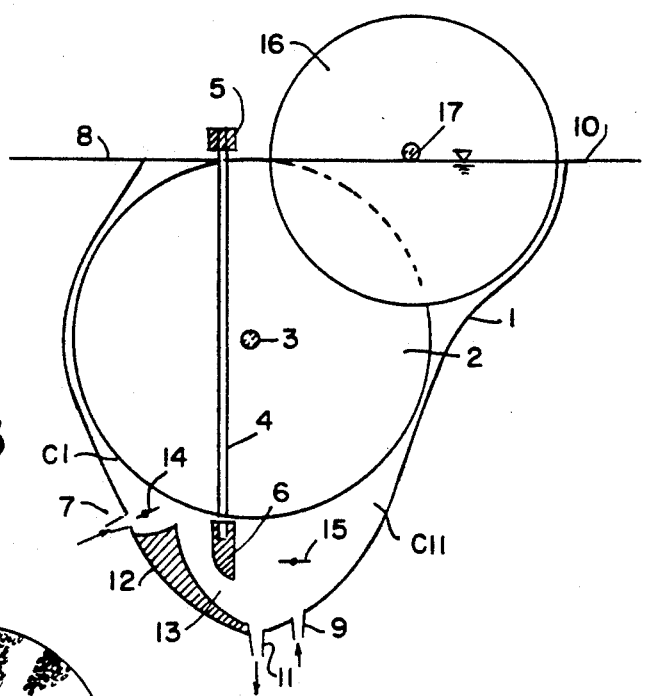
FIG. 3: a three-phase submersion reactor for biological waste water treatment (vertical section)

FIG. 3 shows a specially constructed three-phase submersion reactor 3PSR which is used for implementing the process for biological waste water treatment described with the help of FIG. 1.

In a reactor vessel 1 a submerged biodisk 2 rotates around its rotation axis 3. The inside of the reactor vessel 1 is divided by dividing rods 4 which extend vertically between the plates of the biodisk 3 into a first compartment CI and a second compartment CII. The dividing rods 4 are anchored in an upper dividing wall 5 and a lower dividing wall 6.

A feed pipe 7 for raw waste water merges into the lower part of the first compartment CI. The upper part of the first compartment CI has a first discharge pipe 8 for the solution. A return pipe 9 merges into the lower part of the second compartment CII which reintroduces the solution which was nitrified separately outside the reactor. The upper part of the second compartment CII has a second discharge pipe 10 for the cleaned waste water. Finally, a discharge pipe 11 for excess sludge is located at the bottom of the reactor vessel 1.

The inside wall of the reactor vessel 1 holds below the feed pipe 7 a sludge barrier 12 which extends close to the circumference of the biodisk 2. The lower dividing wall 6 which is rounded at its lower end defines together with the sludge barrier 12 a sludge channel 13 through which activated sludge passes from below the biodisk 2 from the first compartment CI into the second compartment CII.

The mixing of the waste water to be cleaned and the activated sludge suspended in it in the lower part of the reactor is undertaken with mixing blades 14 and 15 which are arranged horizontally below the biodisk 2.

An additional biodisk 16 is located in the upper part of the second compartment CII. Its rotation axis 17 extends parallel to the rotation axis 3 of the submerged biodisk 2 and is located approximately at the filling level of the reactor vessel 1. The plates of this additional biodisk 16 are thus semi-submerged and overlap partially with the plates of the submerged biodisk 2. The semi-submerged additional biodisk 16 and the submerged biodisk 2 rotate counterclockwise in the same direction. While the biodisk 2 rotates only once every eight hours, the additional biodisk 16 rotates comparatively fast with one to two revolutions per minute.

Figure 4:
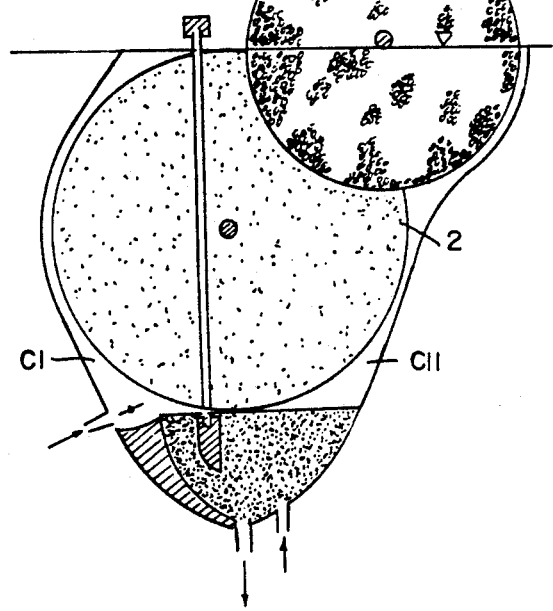
FIG. 4: microorganism settlement on the reactor of FIG. 3, FIG. 5: environmental zones within the reactor of FIG. 3, FIG. 6: the reactor of FIG. 3 as a component of a second alternative plant for biological waste water treatment (schematic).

The first chemoorganotrophic biocenosis I is settled on the submerged biodisk 2—see FIG. 4. Primary and excess sludge settle in the lower part of the reactor. A third refining biocenosis III is settled on the plates of the additional biodisk 16.

Figure 5:
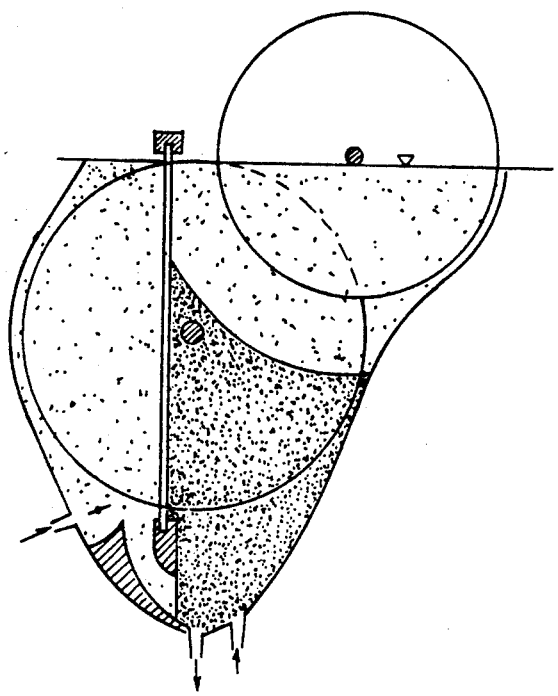

The division of the reactor inside by dividing rods 4 between which the plates of the biodisk 2 rotate is used to create environmental zones, as shown in FIG. 5. The first compartment CI has an anaerobic environment. In the lower and intermediate part of the opposite second compartment, CII has, except for the transition areas, an anoxic environment. Because of the slow rotation of the biodisk 2 and the characteristic environmental zones, the chemoorganotrophic biocenosis I (see FIG. 4) is subject to a cyclic change of anaerobic (ca. 3 hours), anoxic (ca. 3 hours), and aerobic (ca. 2 hours) conditions.

A second technical realization of the process for biological waste water treatment is shown in FIG. 6. The core of this plant is the three-phase submersion reactor 3PSR described above with the help of FIG. 3, 4 and 5. In addition to the reactor 3PSR, the plant comprises a standard solid bed nitrification reactor NIR' which acts as nitrification stage, and a resettling basin RSB'.

The incoming raw waste water passes through the feed pipe 7 (see FIG. 3) into the lower part of the anaerobic first compartment CI of the reactor 3PSR and flows upwards between the disks of its biodisk 2. Hereby the waste water is brought into contact with biocenosis I under anaerobic conditions. Primary sludge and excess sludge from the anaerobic compartment CI pass through the sludge channel 13 into the second anoxic compartment CII. The waste water solution leaves the first compartment CI through the top discharge pipe 8 and is passed to the solid bed nitrification reactor NIR'.

The issue of the solid bed nitrification reactor NIR' flows from the bottom through the return pipe 9 into the second compartment CII which is anoxic in this part. Here the combined denitrification of the solution and the activated sludge now takes place. The solution hereby flows upwards inside the second compartment CII and reaches its upper part. Because of the rotation of the additional biodisk 16, oxygen is supplied here so that an aerobic environment is created. At the same time, the refining biocenosis II which has settled on the plates of the additional biodisk 16 nitrifies ammonium still present.

The cleaned waste water solution leaves the reactor 3PSR through its second discharge pipe 10 which is located on the top.

In the resettling basin RSB' activated sludge contained in the waste water solution settles to the bottom and may be removed from the plant as excess sludge ES.

| | List of Refernce Signs |
|---|---|
| APB | anaerobic preliminary basin |
| ISB | intermediate settling basin |
| NIR | nitrification reactor |
| DER | denitrification reactor |
| SDR | simultaneous denitrification reactor |
| RSB | resettling basin |
| SP | sump pump |
| Byp | sludge bypass |
| SR | sludge return |
| ES | excess sludge |
| 3PSR | three-phase submersion reactor |
| CI | first compartment |
| CII | second compartment |
| 1 | reactor vessel |

-continued

List of Refernce Signs

| | |
|---|---|
| 2 | biodisk |
| 3 | rotation axis (of 2) |
| 4 | dividing rods |
| 5 | upper dividing wall |
| 6 | lower dividing wall |
| 7 | feed pipe (in CI) |
| 8 | first discharge pipe (from CI) |
| 9 | return pipe (in CII) |
| 10 | second discharge pipe (from CII) |
| 11 | excess sludge discharge pipe |
| 12 | sludge barrier |
| 13 | sludge channel |
| 14 | mixing blade |
| 15 | mixing blade |
| 16 | additional biodisk |
| 17 | rotation axis (of 16) |
| NIR' | solid bed nitrification reactor |
| RSB' | resettling basin |

I claim:

1. A process for biological waste water treatment comprising:
   a) a providing a three phase submersive reactor comprising a reactor vessel; a division device dividing the inside of the reactor vessel into a first compartment with an anaerobic environment and a second compartment with anoxic and aerobic environments; a submerged and slowly rotating biodisk which crosses through the division device so as to extend into both compartments and on which a first chemoorganotrophic biocenosis is settled; and an aerator located in the upper portion of the second compartment;
   b) treating incoming raw waste water in the first compartment;
   c) discharging the treated solution from the upper portion of the first compartment;
   d) nitrification of the treated solution using a second chemolithotrophic biocenosis in a nitrification stage with an aerobic environment;
   e) treating the nitrified solution in the second compartment providing;
   e) denitrification in the anoxic environment and aerobic treatment in the aerobic environment;
   f); discharging the cleaned waste water from the upper portion of the second compartment.

2. A plant for biological wastewater treatment comprising a three-phase submersion reactor for biological waste water treatment, comprising:
   a reactor vessel;
   a division device which divides the inside of the reactor vessel into a first compartment with anaerobic environment and a second compartment with anoxic and aerobic environments;
   a submerged and slowly turning biodisk which crosses the division device so as to extend into both compartments on which a first chemoorganotrophic biocenosis is settled;
   a feed pipe for raw waste water the bottom part of the first compartment;
   a first discharge pipe for the solution at the upper part of the first compartment leading to a nitrification stage;
   a return pipe for the introduction of the nitrified solution into the lower part of the second compartment;
   a second discharge pipe for the cleaned waste water at the top part of the second compartment;
   an aerator located in the upper portion of the second compartment.

3. Reactor according to claim 2, wherein the division device is constructed as dividing rods which extend essentially vertically and which are arranged between the plates of the biodisk.

4. Reactor according to claim 3, wherein the dividing rods are anchored with their upper end in an upper dividing wall and with their lower end in a lower dividing wall.

5. Reactor according to claim 4, wherein a sludge channel for activated sludge is provided between the lower dividing wall and the floor of the reactor vessel.

6. Reactor according to claim 5, wherein a sludge barrier which extends close to the circumference of the biodisk is located at the inside wall of the reactor vessel (1) below the feed pipe.

7. Reactor according to claim 5, wherein at the floor of the reactor vessel a discharge for the excess sludge has been provided.

8. Reactor according to claim 2, wherein mixing blades are located below the biodisk.

9. Reactor according to claim 2, wherein the aerator is a rotating, semi-submerged additional biodisk located in the upper part of the second compartment whose plates are located in part between the plates of the submerged biodisk.

10. Reactor according to claim 9, wherein the submerged biodisk and the semi-submerged additional biodisk rotate in the same direction.

11. Reactor according to claim 9, wherein a refining biocenosis is settled on the plates of the semi-submerged additional biodisk.

12. Plant according to claim 2, further comprising a resettling basin connected to the second discharge pipe of the three-phase submersion reactor.

13. Plant according to claim 2, further comprising an intermediate settling basin interposed between the first compartment of the three-phase sumbersion reactor and the nitrification stage.

14. Plant according to claim 2, wherein the nitrification stage is constructed as a solid bed nitrification reactor.

15. Plant according to claim 2, wherein the nitrification stage is constructed as an activation basin with its own intermediate settling and sludge return.

* * * * *